United States Patent
Di Cairano et al.

(10) Patent No.: US 9,037,353 B2
(45) Date of Patent: May 19, 2015

(54) SYSTEM AND METHOD FOR CONTROLLING ELECTRIC POWER STEERING SYSTEM

(71) Applicant: Mitsubishi Electric Research Laboratories, Inc., Cambridge, MA (US)

(72) Inventors: Stefano Di Cairano, Somerville, MA (US); Spyridon Zafeiropoulos, Atlanta, GA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 13/916,717

(22) Filed: Jun. 13, 2013

(65) Prior Publication Data

US 2014/0371992 A1    Dec. 18, 2014

(51) Int. Cl.
*B62D 5/04* (2006.01)
*B62D 6/08* (2006.01)
*B62D 6/10* (2006.01)
*B62D 6/00* (2006.01)

(52) U.S. Cl.
CPC .............. *B62D 5/0463* (2013.01); *B62D 6/008* (2013.01)

(58) Field of Classification Search
None
See application file for complete search history.

(56) References Cited

U.S. PATENT DOCUMENTS

| | | | |
|---|---|---|---|
| 4,951,199 A | 8/1990 | Whitehead | |
| 5,719,766 A | 2/1998 | Bolourchi | |
| 5,845,222 A * | 12/1998 | Yamamoto et al. | 701/41 |
| 5,878,360 A | 3/1999 | Nishino | |
| 5,894,205 A | 4/1999 | Shimizu | |
| 6,148,951 A * | 11/2000 | Nishi et al. | 180/446 |
| 6,450,287 B1 * | 9/2002 | Kurishige et al. | 180/446 |
| 6,470,994 B1 * | 10/2002 | Shimizu et al. | 180/446 |
| 6,505,702 B1 * | 1/2003 | Shinmura et al. | 180/446 |
| 6,658,335 B2 * | 12/2003 | Kleinau | 701/41 |
| 7,966,113 B2 | 6/2011 | Kroehnert | |
| 8,103,411 B2 | 1/2012 | Wijffels et al. | |
| 8,170,751 B2 * | 5/2012 | Lee et al. | 701/42 |
| 8,406,956 B2 * | 3/2013 | Wey et al. | 701/41 |
| 2001/0041957 A1 * | 11/2001 | McCann et al. | 701/41 |
| 2003/0055546 A1 * | 3/2003 | Demerly et al. | 701/42 |
| 2003/0060955 A1 * | 3/2003 | Suissa | 701/41 |
| 2004/0148080 A1 * | 7/2004 | Ekmark et al. | 701/41 |
| 2004/0238265 A1 * | 12/2004 | Tsuchiya | 180/446 |
| 2006/0064214 A1 * | 3/2006 | Takimoto et al. | 701/41 |
| 2007/0284180 A1 * | 12/2007 | Suehiro et al. | 180/444 |
| 2008/0189014 A1 * | 8/2008 | Tanaka et al. | 701/42 |
| 2008/0306655 A1 * | 12/2008 | Ukai et al. | 701/42 |
| 2009/0306856 A1 * | 12/2009 | Fritz et al. | 701/42 |
| 2011/0112716 A1 | 5/2011 | Joeng | |

(Continued)

FOREIGN PATENT DOCUMENTS

EP    1470987 A1    10/2004

*Primary Examiner* — Rami Khatib
*Assistant Examiner* — Navid Ziaeianmehdizadeh
(74) *Attorney, Agent, or Firm* — Dirk Brinkman; Gene Vinokur

(57) ABSTRACT

A method controls a torque of an electric power steering (EPS) system of a vehicle. The method determines, based on a state of a movement of the vehicle, a range of values of the torque of the EPS system satisfying constraints. The constraints include at least one constraint on an effect of the torque of the EPS system on the steering wheel. The method selects a value of the torque within the range of values based on an objective of the movement of the vehicle and commands the EPS system to generate the torque according to the value of the torque.

18 Claims, 13 Drawing Sheets

(56) References Cited

U.S. PATENT DOCUMENTS

| | | |
|---|---|---|
| 2012/0199414 A1 | 8/2012 | Shimizu et al. |
| 2013/0030655 A1 | 1/2013 | Williams et al. |
| 2013/0054073 A1* | 2/2013 | Kageyama et al. ............. 701/22 |
| 2013/0124049 A1* | 5/2013 | Endo et al. ...................... 701/42 |
| 2014/0277945 A1* | 9/2014 | Chandy ........................... 701/42 |

* cited by examiner

SYSTEM AND METHOD FOR CONTROLLING ELECTRIC POWER STEERING SYSTEM

FIELD OF THE INVENTION

This invention relates generally to electric power steering (EPS) systems in vehicles, and more particularly to controlling the EPS systems.

BACKGROUND OF THE INVENTION

Electric power steering (EPS) systems generate a torque on the steering column of a vehicle. A common objective of the control methods for EPS is to reduce the effort of the driver in turning a steering wheel. See, e.g., U.S. Pat. No. 5,719,766, U.S. Pat. No. 5,894,205, U.S. Pat. No. 5,878,360 describing various configurations of the EPS systems and the operation of EPS systems to reduce the effort of the drivers in turning the steering wheel.

Steering system architectures have impact on a movement of the vehicle. Some methods describe uses of the EPS systems to improve the performance of cornering the vehicles and yaw stability control, see e.g., U.S. Pat. No. 4,951,199, U.S. 20110112716, U.S. Pat. No. 5,719,766. Similarly, U.S. Pat. No. 8,103,411 describes an over-steering control method. However, the application of those concepts is limited, because the EPS actuator is mechanically connected to the steering wheel and actuation of the EPS system affects the driver. Improper design or control of the EPS can be detrimental, and can range from a mild annoyance to the driver, e.g., a reduced "feel" for the road, to serious problems, such as lost sensitivity to the lateral response of the vehicle and perhaps a loss of maintaining the stability of the vehicle. In some cases, the improper design or control of the EPS can lead to threatening damages to the driver, such as excessive strain on driver arms leading to injuries.

Thus, the conventional EPS systems, in order to avoid improper impact of the EPS action on the driver, are designed as an extension of the driver arm and the value of torque applied by the EPS system to the steering column is uniquely determined by the current state of the steering mechanism.

As a consequence, conventional systems do not use EPS for different driving objectives, such as cornering performance and vehicle stability control. For example, conventional yaw stability control systems enforce vehicle stability control by generating a yaw moment through application of different torques to different wheels. For example, the system described in U.S. Pat. No. 7,966,113 B2 uses brakes to achieve different torques. That system can be effective for rapid stability recovery, but can cause discomfort to the driver due to sudden unexpected rotational and longitudinal decelerations. In addition, the braking actuation mechanism is not precise, so that the engagement of the system is delayed as much as possible and used only for stability recovery, and not for precise stability control.

Vehicle cornering performance can also be improved by using variable steering gears, also known as active steering mechanisms that allow changing the relation between the steering wheel angle and the wheels. However, that approach requires specific actuators, which are costly and have the following disadvantages: the driver may lose the "feel for the road", i.e., the driver does not feel the alignment torque that is the indicator for stability losses; and the steering always moves in the direction of least resistance, hence if the driver releases the steering wheel, the actuator turns the steering columns and not the wheels.

Accordingly, there is a need to use the EPS systems to assist in all of the above situations and many others, while avoiding the improper effect of the EPS action on the driver.

SUMMARY OF THE INVENTION

Various embodiments of the invention exploit different capabilities of an electric power steering (EPS) for different objectives of movement of the vehicle by not limiting the EPS system to generate a single torque action for a given state of a movement of a vehicle. Instead, the EPS system according to some embodiments of the invention generates a range of admissible values for the EPS action for the state of the movement, e.g., depending on a current state of the vehicle and a state of a steering wheel of the vehicle. Such range of values is determined, at least in part, by constraints including a constraint on the effect of the torque of the EPS system on the steering wheel.

Then, among the admissible values of the EPS torque, the torque value applied to the vehicle is selected based on the current objective of the movement of the vehicle. Examples of the objectives of the movement include maintaining the vehicle in a certain position with respect to the center of a lane, improving the turning angle of the vehicle, maintaining and recovering vehicle motion stability, and reducing the effort of the driver to a comfortable yet safe level. In some embodiments, the objectives of the movement can change during the operation of the vehicle.

Selecting a current value of EPS torque based on a specific objective of the movement enables the EPS to generate different torques for different objectives. For example, the EPS torque required for maintaining a vehicle within the lane can be different from the torque required to optimize cornering performance. In addition, constraints on impact of the EPS torque on the steering wheel ensure the comfort of the driver regardless of the objective.

Accordingly, one embodiment discloses a method for controlling a torque of an electric power steering (EPS) system of a vehicle. The method determines, based on a state of a movement of the vehicle, a range of values of the torque of the EPS system satisfying constraints. The constraints include at least one constraint on an effect of the torque of the EPS system on the steering wheel. The method selects a value of the torque within the range of values based on an objective of the movement of the vehicle and commands the EPS system to generate the torque according to the value of the torque. Steps of the method can be performed by a processor.

Another embodiment discloses a method for controlling a torque of an electric power steering (EPS) system of a vehicle. The method includes determining an objective of a movement of the vehicle; determining a cost function of the movement of the vehicle based on the objective of the movement; determining constraints defining a range of values of the torque of the EPS system, wherein the constraints are based on a state of the movement and include at least one effect constraint on effect of the torque of the EPS system on a steering wheel of the vehicle, and at least one objective constraint selected based on the objective of the movement of the vehicle; and optimizing the cost function subject to the constraints.

Yet another embodiment discloses an electric power steering (EPS) system of a vehicle, comprising a processor for determining, based on a state of a movement of the vehicle, a range of values of the torque of the EPS system satisfying constraints including at least one constraint on an effect of the torque of the EPS system on a steering wheel and for selecting a value of the torque within the range based on an objective of the movement of the vehicle; and a motor generating the torque according to the selected value.

DETAILED DESCRIPTION OF THE PREFERRED EMBODIMENT

Figure 1A:
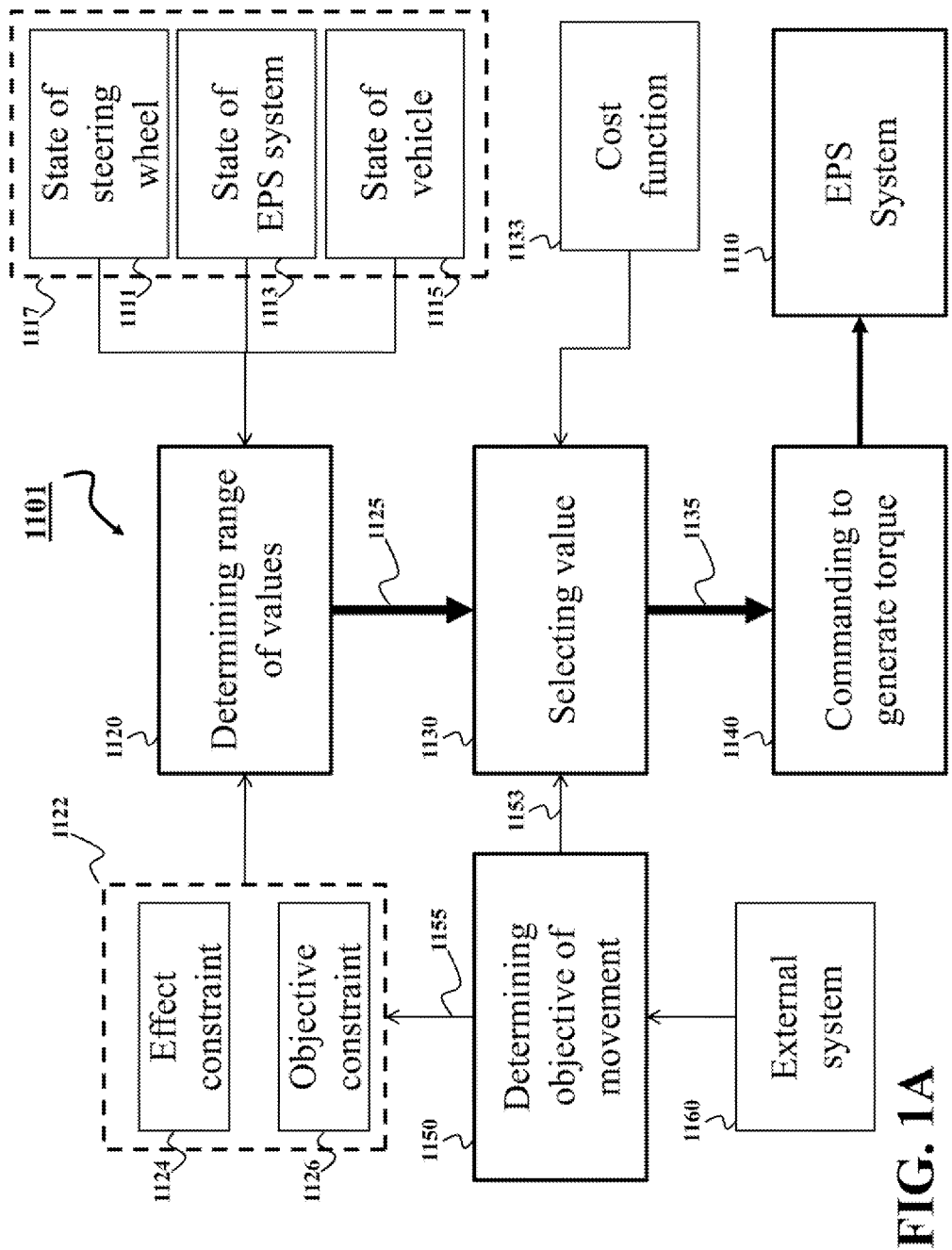
FIG. 1A is a diagram of a method for controlling a torque of an electric power steering (EPS) system of a vehicle according to some embodiments of the invention.

FIG. 1A shows a diagram of a method for controlling a torque of an electric power steering (EPS) system 1110 of a vehicle according to some embodiments of the invention. Steps of the method can be implemented by a processor 1101. The embodiments determine 1120 a range 1125 of values of the torque of the EPS system satisfying constraints 1122. The constraints 1122 include at least one constraint 1124 on an effect of the torque of the EPS system on the steering wheel. The constraint 1124 ensures that for any value of the torque within the range 1125, the comfort and safety of the driver of the vehicle are maintained within acceptable level determined, e.g., by a designer of the EPS system 1110.

The constraint 1124 can be predetermined or selected 1155 based on an objective of the movement of the vehicle. The constraints 1122 can also include additional constraints. For example, in some embodiments the constraints 1122 include at least one objective constraint 1126 selected based on the objective 1153. The objective constraint ensures that the objective of the movement is satisfied.

In some embodiments, the objective of the movement of the vehicle is also determined by the processor 1101. In alternative embodiments, the objective is received from an external system 1160. Examples of the external system 1160 can include an application connected to a GPS or a camera for tracking a position of the vehicle within road lanes, or a sensor sensing a friction of the tires with the road. In one embodiment, the processor 1101 is integrated with the EPS system 1110, receives measurements from various sensors of the EPS system and determines 1150 the objective of the movement 1153 and the constraints 1122 based on the measurements.

In various embodiments, the range of the values 1125 is determined 1120 during a movement of the vehicle and based on a state 1117 of the movement. For example, the state 1117 can include one or combination of a state of a steering wheel 1111, a state of the EPS system 1113 and a state of the vehicle 1115. In some embodiments, the range is updated dynamically in response to the change of the state 1117. Those embodiments allow updating the range 1125 additionally to or independently from the action of the driver, e.g., in response to the change of movement conditions, e.g., a change of the state of the vehicle 1115.

The embodiments select 1130 a value 1135 of the torque within the range of values 1125 based on the objective 1153 of the movement of the vehicle and a command 1140 to the EPS system to generate the torque according to the value 1135. Some embodiments select the value 1135 randomly within the range 1125. Alternatively, some embodiments select the value 1135 by optimizing the cost function 1133 subject to the constraints 1122. In some embodiments, the cost function is selected based on the objectives 1153. In alternative embodiments, the cost function is selected based on other parameters of optimization, e.g., energy savings.

Figure 1B:
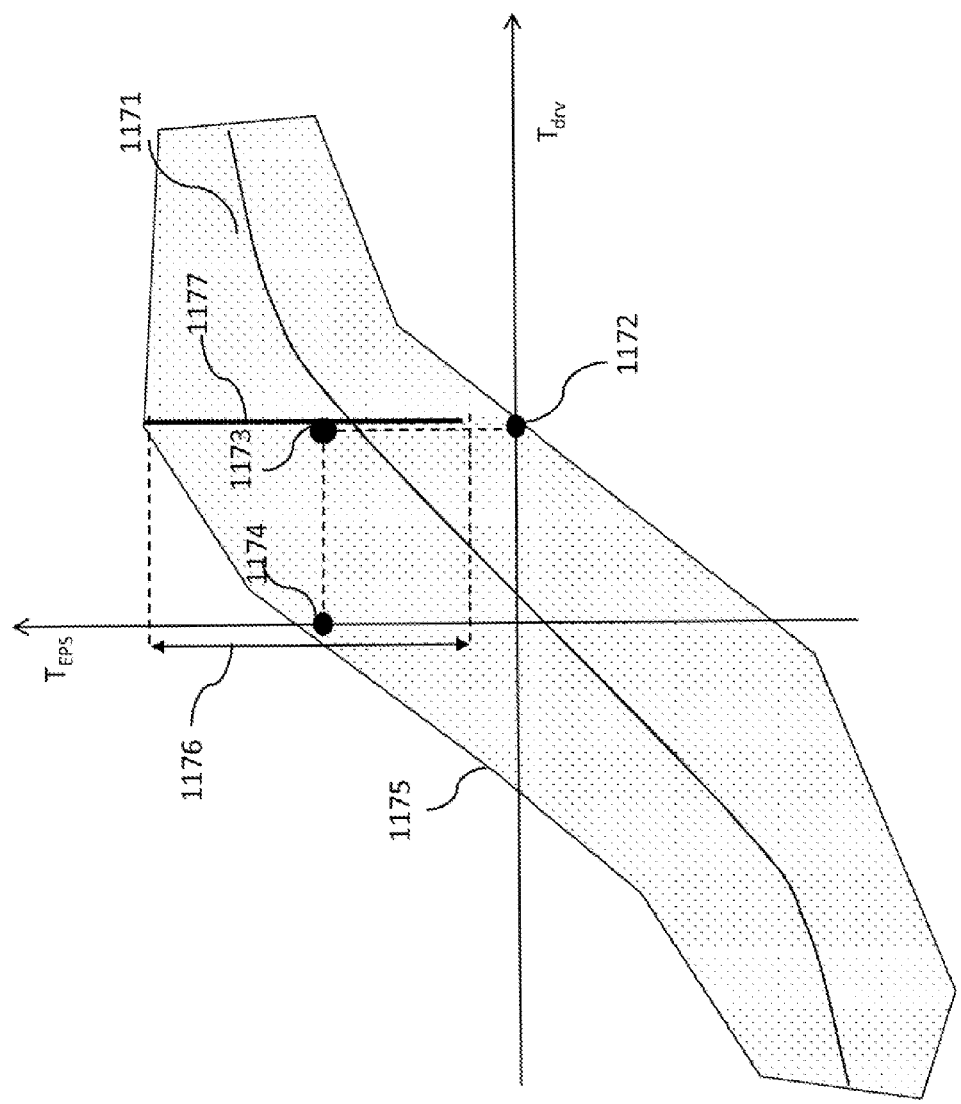
FIG. 1B is a schematic illustrating a difference between a function-based generation of the value of the EPS torque and a constraint-based generation of a range of EPS torque values as a function of time.

FIG. 1B shows a difference between a function-based generation of the value of the EPS torque and a constraint-based generation of a range of EPS torque values as a function of time. For clarity, in FIG. 1B, only the EPS torque generated by the EPS system and the driver torque generated by a force applied by a driver to a steering wheel are considered.

If a function 1171 of the driver torque is used for selecting the EPS torque, for a given value of driver torque 1172 only one value 1173 of the EPS torque 1174 can be selected. On the other hand, if the constraint-based selection is used, the torque generated by the EPS system is bounded within the region 1175 and for the given value of the driver torque 1172, a range of EPS torques 1176, e.g., a segment 1177 can be selected. Any value of the EPS torque selected in the segment 1177 is guaranteed to respect driver comfort and safety, and hence the selection can be operated to optimize any current objective of the movement of the vehicle.

Figure 1C:
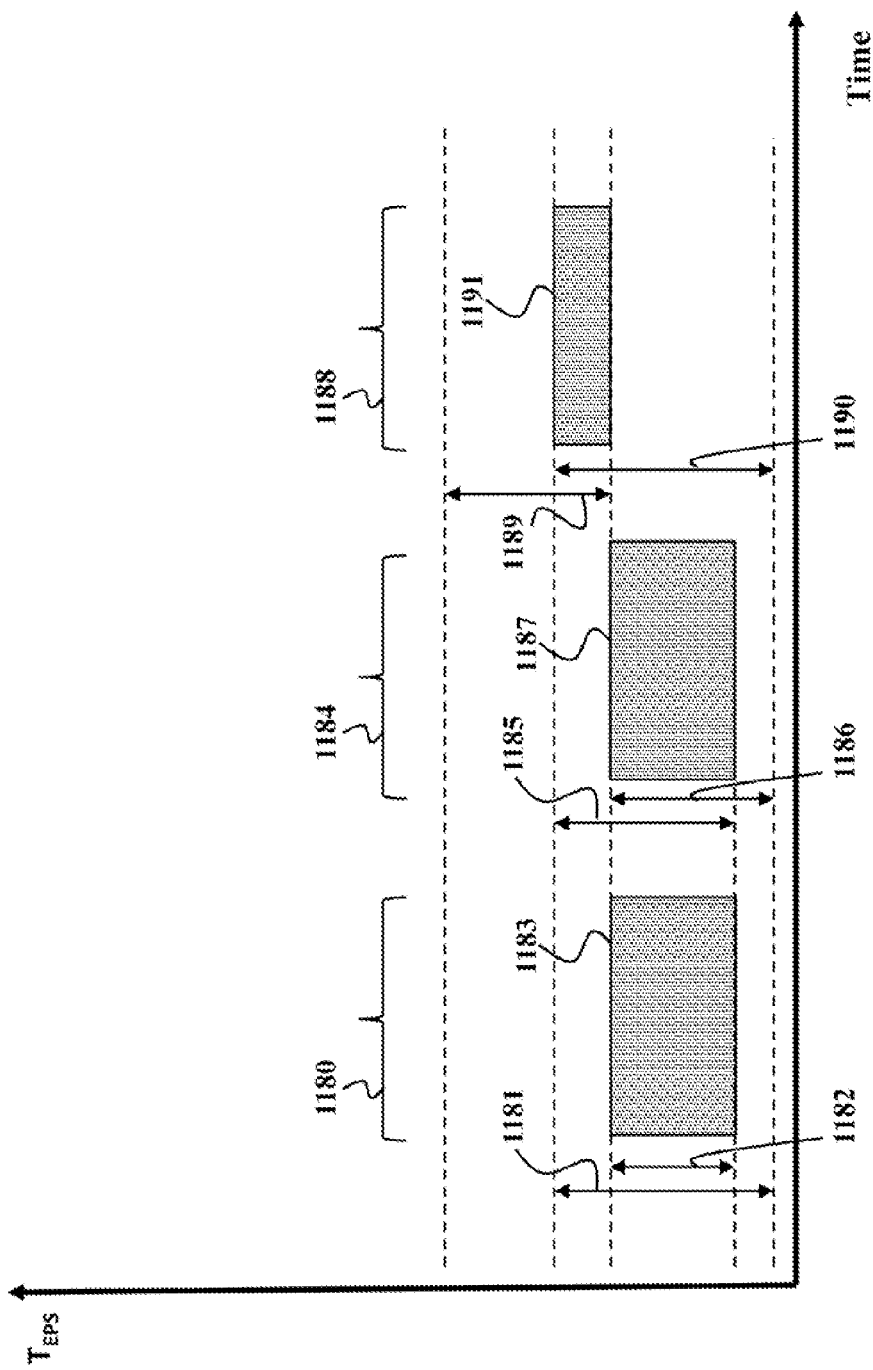
FIG. 1C is a schematic illustrating principles of the constraint-based generation of the range of EPS torque values employed by some embodiments of the invention.

FIG. 1C illustrate principles of the constraint-based generation of the range of EPS torque values employed by some embodiments of the invention. At different points of time, such as periods 1180, 1184 and 1188, the range of the values of the torques of the EPS system is selected by intersecting a range of values controlled by the effect constraints on effect on the torque of the EPS system on the steering wheel and a range of values controlled by the objective constraints selected based on the objective of the movement.

For example, the intersection of the objective constraints 1181 and the effect constraints 1182 at the time period 1180 defines the range 1183 of possible values of the torque of the EPS system. The intersection of the objective constraints 1185 and the effect constraints 1186 at the time period 1184 defines the range 1187 of possible values of the torque of the EPS system. Similarly, the intersection of the objective constraints 1189 and the effect constraints 1190 at the time period 1188 defines the range 1191 of possible values of the torque of the EPS system. By varying the objective and/or effect constraints for different period of times, some embodiments exploit different capabilities of the EPS system for different objectives of the movement of the vehicle, and ensure the comfort of the driver regardless of the objective.

Figure 2:
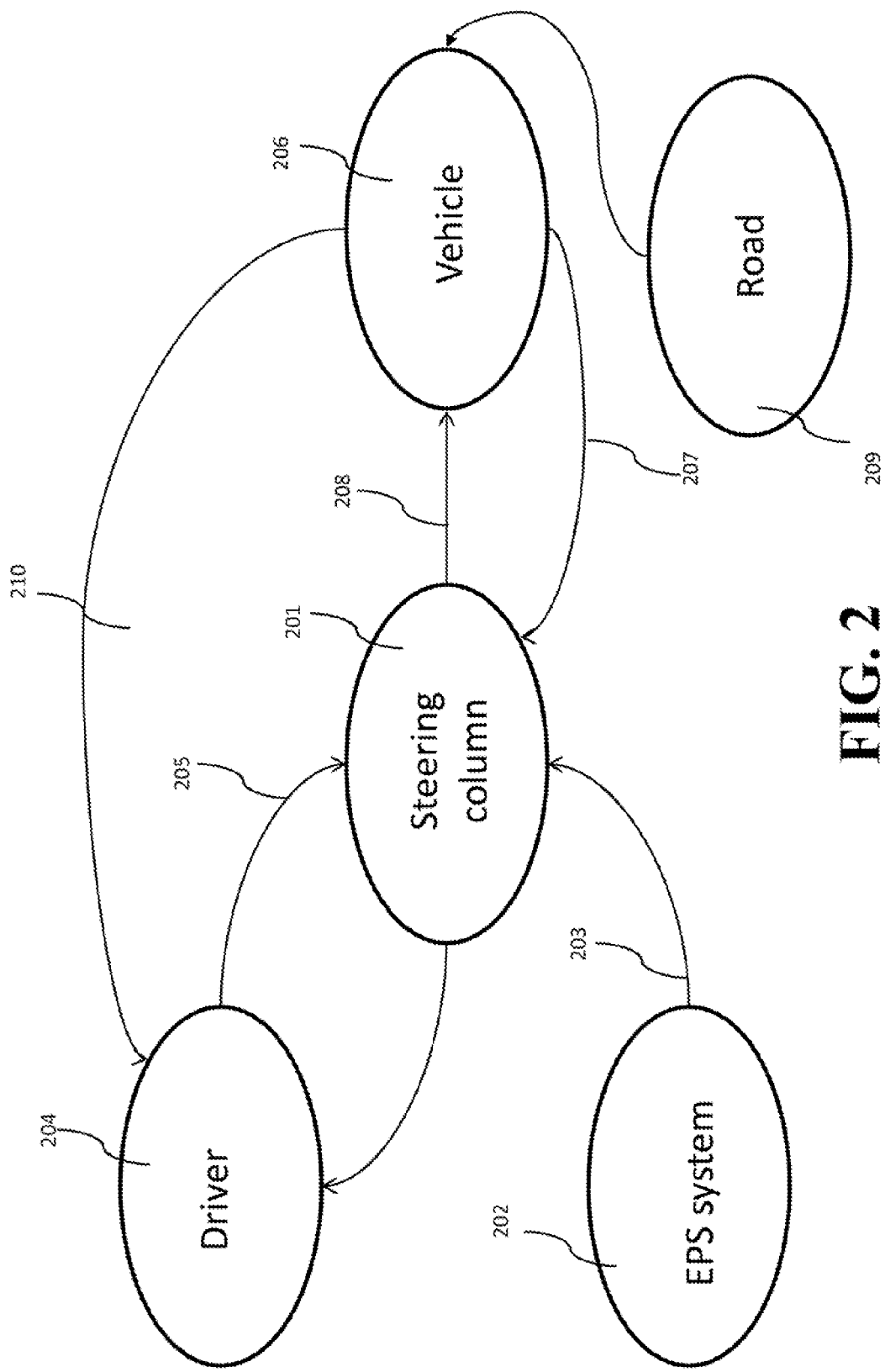
FIG. 2 is a schematic of the interactions of a torque generated by an EPS system with torques generated by a driver and friction of a vehicle with the road.

FIG. 2 shows a schematic of the interactions of an EPS system with a driver and a vehicle. The EPS system affects the steering of the vehicle by applying torque to the steering column of a vehicle. The torque on the steering column causes a rotation of the steering column. The torque on the steering column can also be applied by the driver by rotating the steering wheel, and by the friction of the road 209, feeding back torque via the wheels, through the alignment torque on the vehicle wheels propagated by the steering rack on the column.

For example, the motion of the steering column 201 is affected by the EPS system 202 through the EPS torque $T_{EPS}$ 203, by the driver 204 through the driver torque $T_{drv}$ 205, and by the movement of the vehicle 206 through the alignment torque $T_{aln}$ 207, which is the torque generated by the friction between the wheels and the road.

The effect of the torques on the steering column is described by the steering column motion equation $$J_c \ddot{\phi} = T_{EPS} + T_{drv} - T_{aln} - \beta \dot{\phi}, \quad (1)$$

where $\phi$ is an angle of the steering column and a dot indicates a first derivative with respect to time, and two dots indicate second derivative with respect to time, $\beta$ is a friction on the rotation of the steering column and $J_c$ is an inertia of the steering column including all the jointly rotating components.

The alignment torque $T_{aln}$ can be determined from an inversion of Equation (1) according to $$T_{aln} = +T_{EPS} - J_c \ddot{\phi} + T_{drv} - \beta \dot{\phi}. \quad (2)$$

The motion of the steering column 201, which can be measured by e.g., an angle and a rotation speed of the steering column, affects the movement of the vehicle 206 according to an equation $$\dot{x} = f(x, \phi, \phi^x), \quad (3)$$

where x includes the values describing the state of the vehicle, e.g., a yaw rate, a lateral acceleration, a velocity, a longitudinal acceleration, a tire slip angles, a position on the road or the location of the vehicle, and where the function $f$ is specified according to the desired degree of details describing the movement of the vehicle.

The function $f$ in Equation (3) can be defined in a number of ways. For example, one embodiment defines the function in terms of yaw rate and lateral velocity. Another embodiment includes terms modeling the position of the vehicle, and uses additional quantities, such as longitudinal velocity and acceleration. Another embodiment defines the function $f$ in Equation (3) using a model describing the movement of the vehicle.

Figure 3:
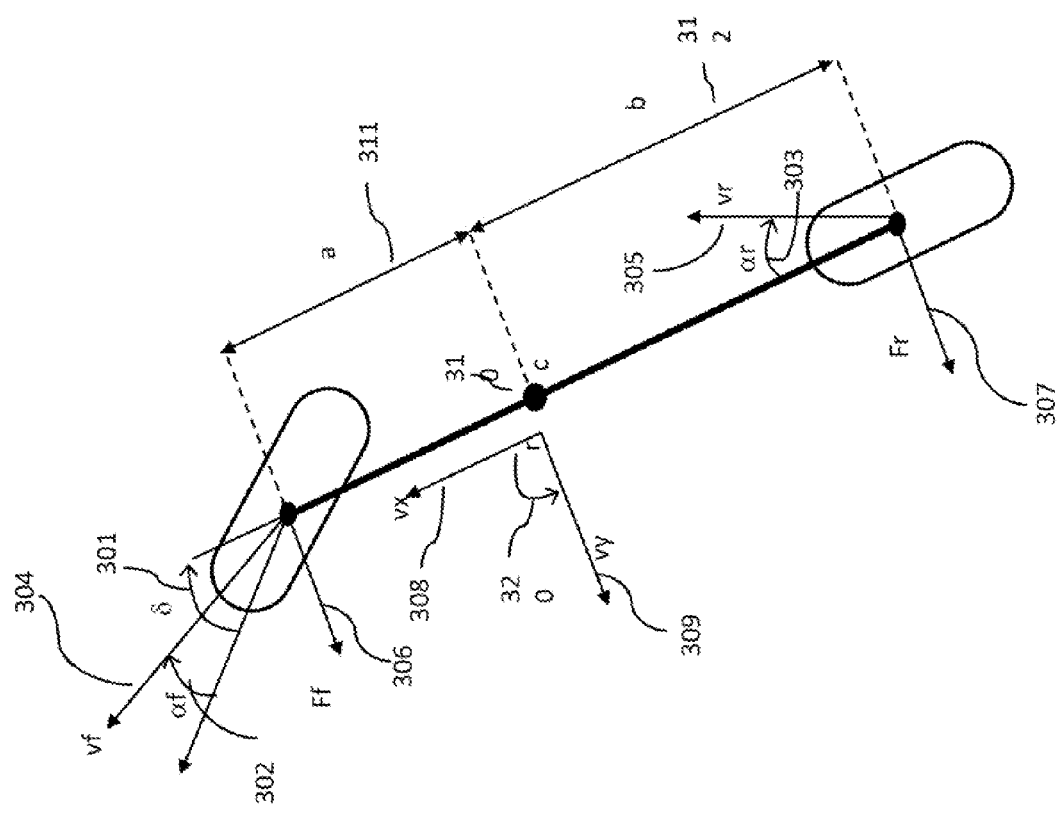
FIG. 3 is a representation of a single-track model describing the movement of the vehicle.

FIG. 3 shows a representation of a single-track model describing the movement of the vehicle for determining the function $f$ according to some embodiments of the invention. The model includes the approximated tire force characteristics, and the effect of the movement of the vehicle on the tire forces and alignment torque. In this single-track model, the vehicle is represented as a single-track vehicle (bicycle), which assumes that the left and right sides of the vehicle operate symmetrically.

The model includes a road wheel angle 6301, angles of the tire sideslip $\alpha f$ 302 and $\alpha r$ 303, i.e., which are the angles between the velocities at the wheels, and the wheel directions vf 304 and vr 305 for front and rear tires, respectively. The model also includes the forces at the front and rear tires Ff 306 and Fr 307, the longitudinal vx 308 and lateral vz 309 velocities at the vehicle center of mass c 310, the vehicle mass m the vehicle inertia Iz along the vertical axis at the center of mass c 310, the distances from the vehicle center of mass of front a 311 and rear b 312.

Using the model described in FIG. 3, the function $f$ can be defined according to $$\dot{\alpha}_r = \frac{F_f + F_r}{mv_x} - \frac{v_x}{a+b}(\alpha_f - \alpha_r + \delta) - \frac{b}{v_x I_z}(aF_f - bF_r), \quad (4)$$

$$\dot{\alpha}_f = \frac{F_f + F_r}{mv_x} - \frac{v_x}{a+b}(\alpha_f - \alpha_r + \delta) + \frac{a}{v_x I_z}(aF_f - bF_r) - \gamma,$$

$$\dot{\delta} = \gamma,$$

$$\delta = \frac{\phi}{G_g},$$

$$\dot{\delta} = \frac{\dot{\phi}}{G_g},$$

wherein $G_g$ is a gear ratio between steering column and wheel angle. In addition the tire forces are usually a function of the slip angles 302, 303 and road friction coefficient $\mu$.

Figure 4B:
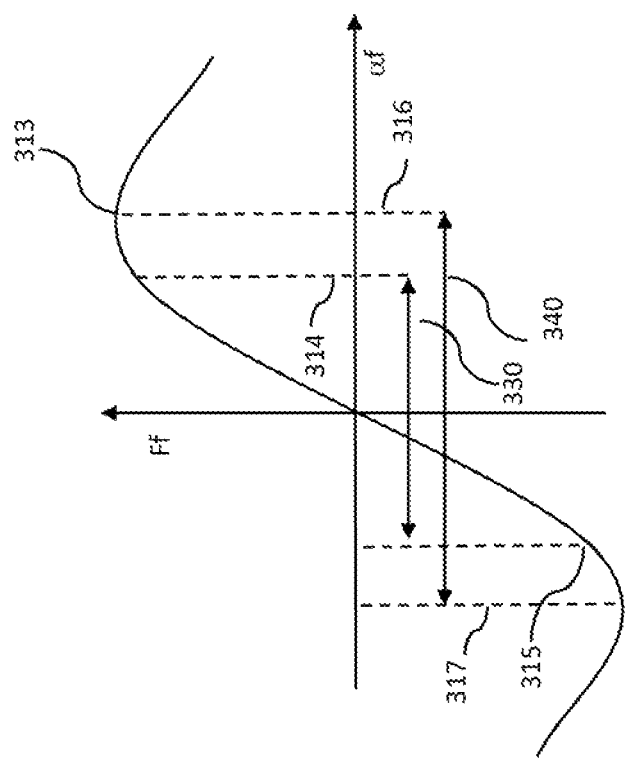
FIG. 4B is a schematic illustrating a relation of the alignment torque to the state of the vehicle.
Figure 4A:
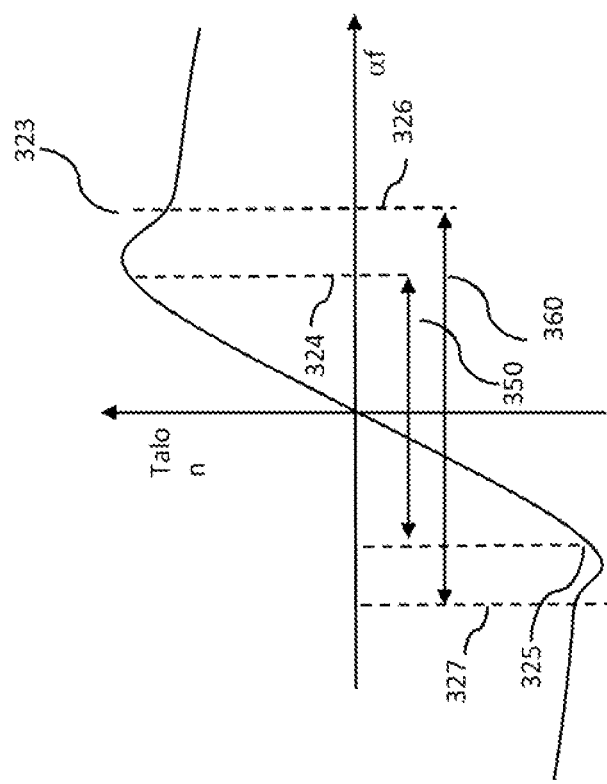
FIG. 4A is a schematic illustrating a relation of the front tire force to the state of the vehicle.

FIG. 4A shows a curve 313 representing the function $f$ for the front tire force as a function of the vehicle state, and in the angle $\alpha\phi$. For a fixed road friction coefficient $\mu$, the curve 313 has a linear region 330, bounded by limits 314, 315, and a stable region 340 bounded by limits 316, 317. In the linear region the control of the vehicle is predictable. In the stable region outside the linear region, the control of the vehicle is difficult, but possible. Outside the linear region, the control of the vehicle is extremely hard or even impossible, which means for instance that the yaw rate 320 becomes unmanageable and the vehicle spins out of control.

FIG. 4B shows a relation of the alignment torque to the state of the vehicle, and in particular of $\alpha\phi$, by a curve 323 that depends on slip angle at the front wheel and road friction coefficient $\mu$. The curve has a linear region 350 bounded by limits 324, 325, and a stable region 360 bounded by 326, 327. In the linear region, the alignment torque provides a good indication on the movement of the vehicle by increasing the resistance torque on the steering wheel with linear proportionality to the slip angle at the front wheel (which is proportional to the vehicle yaw rate). In the stable region outside the linear region, the indication provided by the alignment torque is more difficult to perceive but still present. Outside the linear region, the alignment torque provides substantially no indication on the movement of the vehicle.

The driver is affected by the vehicle motion quantities 210, such as yaw rate, and velocity of the vehicle. Also, the driver is affected by the EPS through the change of the resistance torque on the steering column via the steering wheel. The resistance torque sensed by the driver, called feedback torque $T_{fb}$ is $$T_{fb} = T_{aln} - T_{EPS}. \quad (5)$$

If there is no EPS torque, then the feedback torque is equal to the alignment torque, and hence the driver can sense the vehicle behavior. However, when the EPS system applies a torque, the feedback torque is no longer equal to the alignment torque and the driver perception of the vehicle behavior may be affected. The feedback torque $T_{fb}$ is equal to the strain on the drivers arm $T_{str}$. Thus, if the torque is large, a large strain torque affects the driver, which can be undesirable and dangerous.

To avoid such negative effects on the driver, the EPS torque can be defined by a fixed function (usually of the driver torque $T_{drv}$ modulated by the vehicle velocity) to avoid potential problems. However, in such case the EPS system can only generate a single value of assist torque that restricts the types of operations that can be performed by the EPS system. For instance, to preserve the feel of the driver for the road, some EPS systems may only generate torque in the same direction as the torque generated by the driver. As a consequence, such EPS systems can only amplify the driver behavior, but cannot help achieving general vehicle motion objectives. In fact, such EPS systems cannot improve the cornering performance of the vehicle by applying an aggressive lead action because this requires subsequent elimination of the vehicle yaw rate overshoot counteracting the driver torque.

In contrast, various embodiments of the invention are based on a realization that the safety and comfort of the driver can be preserved without excessively limiting the behavior of the EPS system by allowing the EPS to generate a range of values of the assist torque for a given vehicle and driver state. The range of the driver torque is defined by appropriate constraints that are designed to preserve the safety and comfort of the driver. The constraints can be defined in terms of current steering wheel torque (driver torque), current alignment torque, and EPS torque. In combination, the constraints define the range of torques values that the EPS can possibly apply in relation to the driver and alignment torques. Within the range of applicable torques, the torque that is actually applied can be selected according to specific objectives of the movement, and possibly according to additional constraints on the movement.

Effect Constraints

Various effect constraints alone or in combination are used by different embodiments of the invention. Some of the more common constraints are detailed below, but it should be understood that more constraints can be designed to determine the amount and types of comfort levels suitable to the driver.

Feedback Torque Constraint

Figure 5:
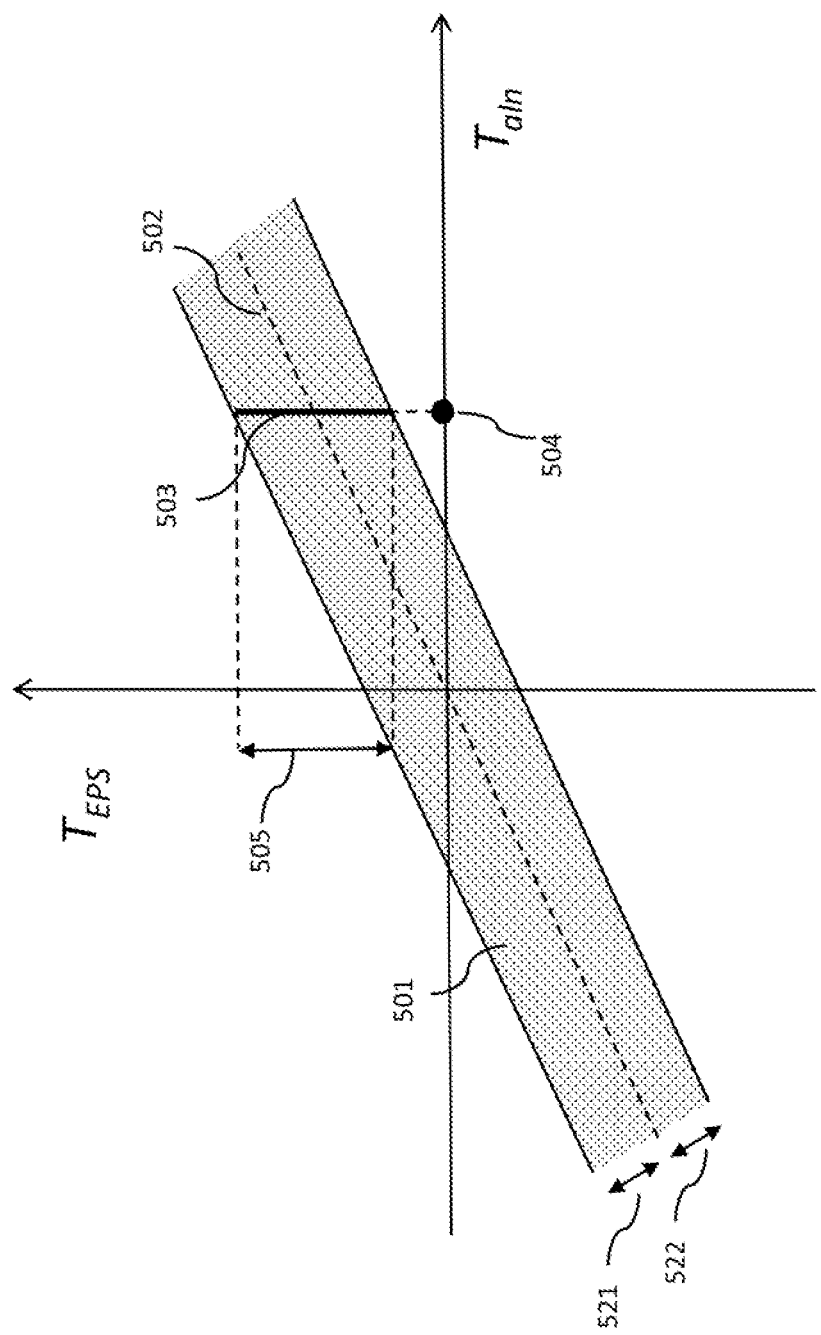
FIG. 5 is a schematic illustrating a feedback torque constraint according to one embodiment of the invention.

FIG. 5 shows a feedback torque constraint on a minimal and a maximal feedback torque on the steering wheel according to one embodiment of the invention. The feedback torque constraint limits the feedback torque the driver senses from in the steering wheel to prevent discomfort and possibly injuries for the driver. The feedback torque constraint can be determined according to $$T_{fb}^{min} \leq T_{aln} - T_{EPS} \leq T_{fb}^{max}, \quad (6)$$

The leftmost and rightmost terms are negative and positive constants defined to ensure a certain degree of comfort for the driver. The conditions that satisfy Equation (6) are described in terms of alignment torque and EPS torque by the area 501, where line 502 indicates the conditions where the feedback torque is zero. In some embodiments, the feedback torque constraint bounds the difference between the alignment torque $T_{aln}$ and EPS torque $T_{EPS}$.

For instance, given a value of the alignment torque $T_{aln}$ 504, the segment 503 indicates that acceptable range of the values of EPS torques. The widths 521 and 522 are determined by the right and left constants in Equation (6), respectively.

Driver Torque Related EPS Torque Constraint

Figure 6:
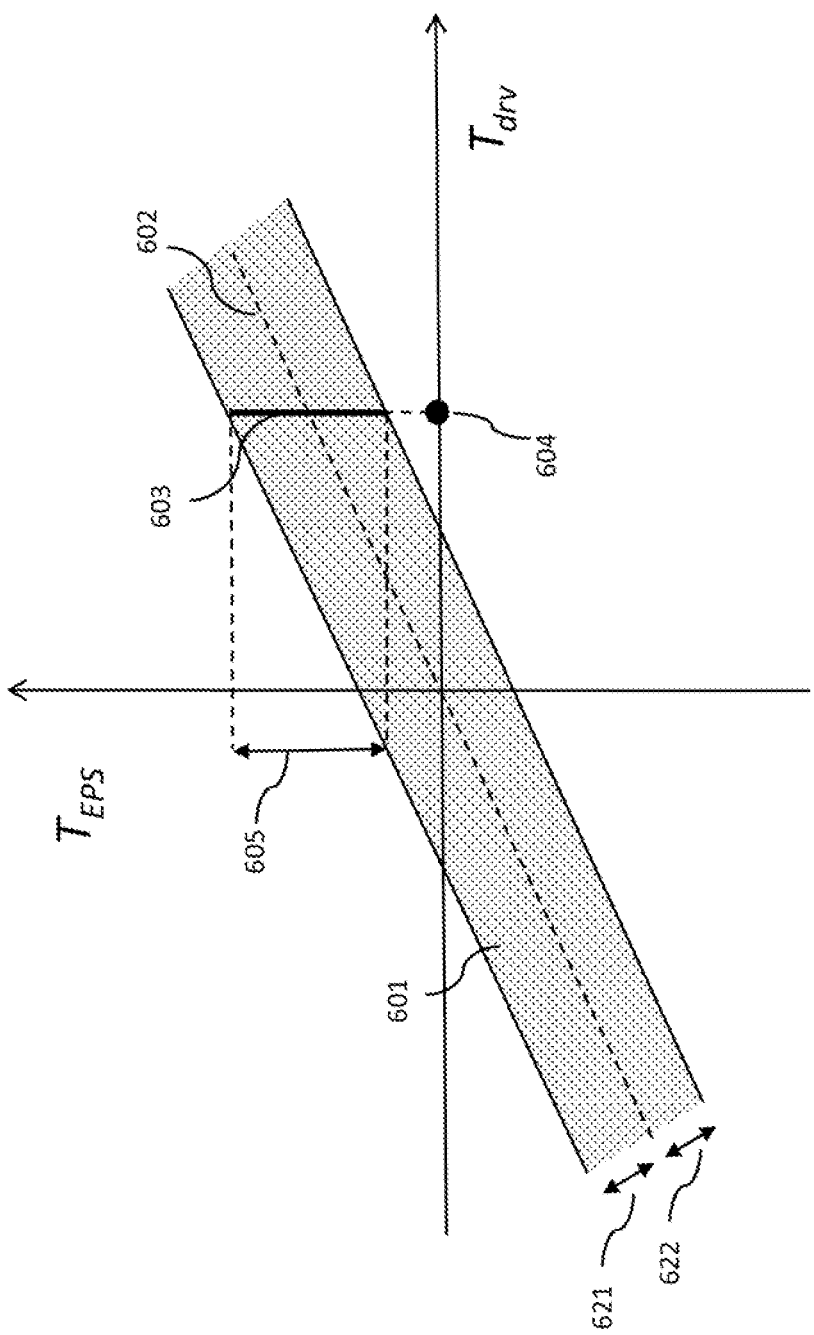
FIG. 6 is a schematic illustrating a driver torque constraint according to one embodiment of the invention.

FIG. 6 shows an illustration of a driver torque related EPS torque constraint on a minimum and a maximum amount of EPS system torque in relation to the torque currently applied on the steering wheel by the driver according to one embodiment of the invention. The driver torque related EPS torque constraint limits the amount of EPS torque based on the current torque applied by the driver according to $$T_{fb}^{min} \leq T_{drv} - T_{EPS} \leq T_{fb}^{max}. \quad (7)$$

The leftmost and rightmost terms are negative and positive constants defined to ensure a certain degree of comfort for the driver. The driver torque related EPS torque constraint ensures that no excessive actions are applied by the EPS system in comparison to the driver actions, thus avoiding discomfort and possibly injuries for the driver.

The conditions that satisfy Equation (7) are described in terms of driver torque and EPS torque by the area 601, where line 602 indicates the conditions where the EPS torque is equal to the driver torque. In some embodiments, the driver torque constraint bounds the difference between the driver torque $T_{drv}$ and EPS torque $T_{EPS}$.

For instance, given a value of the driver torque $T_{drv}$ 604, the segment 603 indicates that acceptable range 605 of the values of EPS torques. The widths 621 and 622 are determined by the right and left constants in Equation (7), respectively.

Constraint on Percentage of the Alignment Torque

Figure 7:
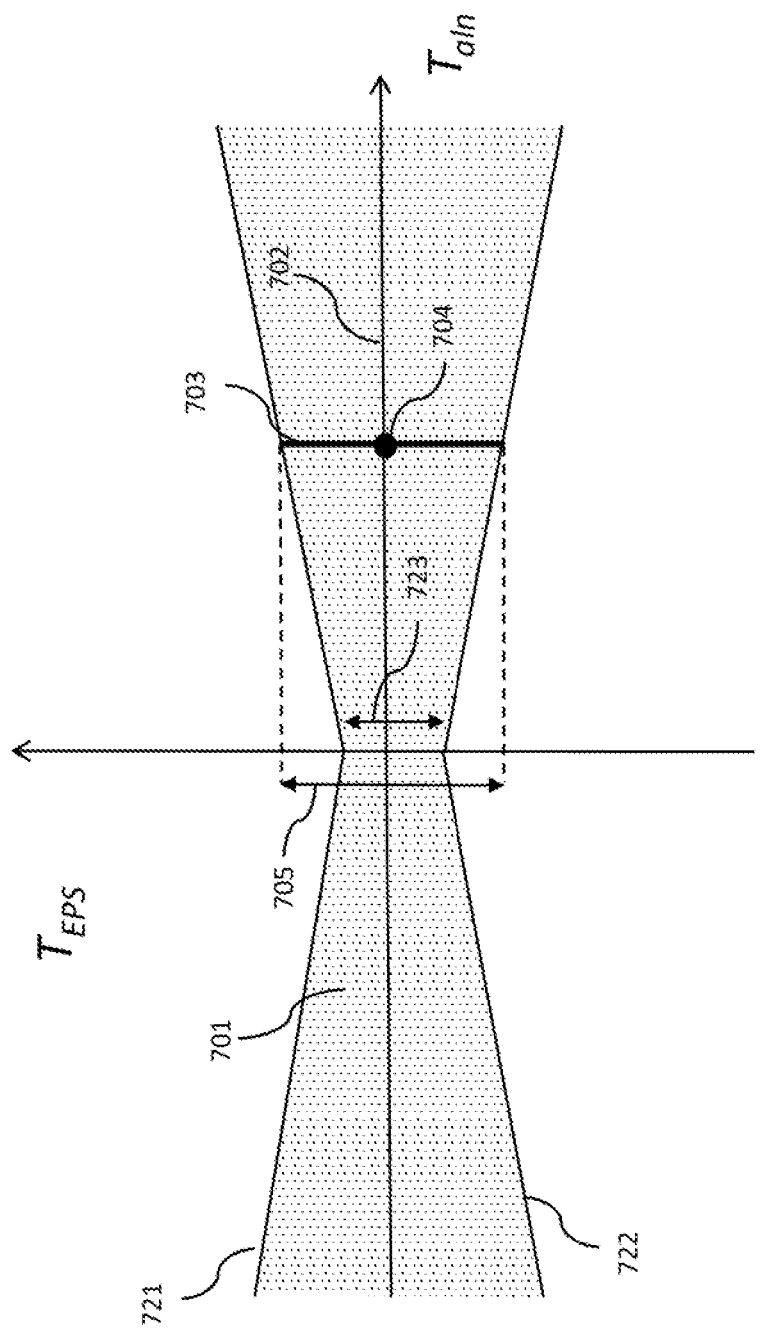
FIG. 7 is a schematic illustrating a constraint on a percentage of the alignment torque according to one embodiment of the invention.

FIG. 7 shows an illustration of a constraint on a percentage of the alignment torque propagated to the steering wheel according to some embodiments of the invention. The constraint on the percentage of the alignment torque preserves the feeling for the road of the driver, which is used by the driver to understand the behavior of the vehicle and apply necessary control actions on the steering wheel.

In one embodiment, this constraint can be enforced by $$\begin{cases} (1-c)T_{aln} - \varepsilon \leq T_{fb} \leq (1+c)T_{aln} + \varepsilon & \text{if } T_{aln} \geq 0 \\ (1+c)T_{aln} - \varepsilon \leq T_{fb} \leq (1-c)T_{aln} + \varepsilon & \text{if } T_{aln} < 0, \end{cases} \quad (8)$$

where c is the percentage of allowed distortion of the alignment torque and $\varepsilon$ is a constant offset that allows to maintain operations at low alignment torques. Both constants c and $\varepsilon$ are selected to ensure a certain degree of comfort for the driver. Usually, values of the constant c is between 0 and 1, and value of the constant $\varepsilon$ is greater than 0.

The conditions that satisfy Equation (7) are described in terms of alignment torque and EPS torque by the area 701, where line 702 indicates the conditions where the EPS torque is equal to 0 and by Equation (5) the feedback torque on the steering wheel is equal to the driver torque. For instance, given a value of the alignment torque $T_{aln}$ 704, the range of admissible conditions 703 indicates that the range of EPS torque 705 is acceptable. The inclination of lines 721 and 722 and the width of 723 are determined by the values of the constants c and $\varepsilon$ in Equation (8).

Intervention Torque Constraint

Figure 8:
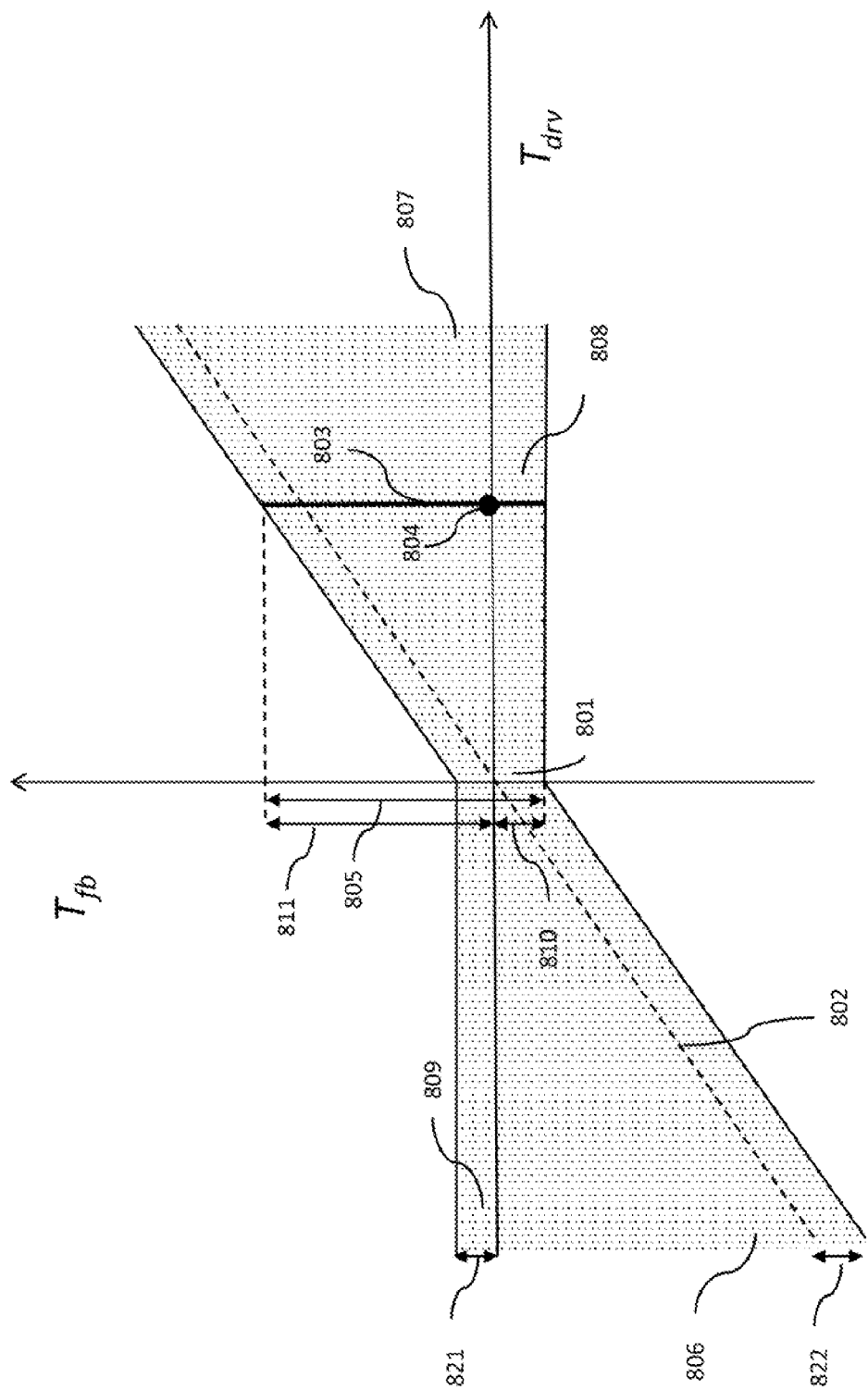
FIG. 8 is a schematic illustrating an intervention torque constraint according to one embodiment of the invention.

FIG. 8 shows an illustration of an intervention torque constraint relating the feedback torque felt by the driver on the steering wheel to the torque that the driver applies on the steering wheel. The intervention torque constraint limits the forcefulness of the EPS steering system and its capability to modify the driver action. In some embodiments, the intervention torque constraint is designed such that the EPS system is able to overcome the driver action by at most a fixed value, and is able to assist the driver action by at most another fixed value according to $$\begin{cases} -\varepsilon \leq T_{fb} \leq T_{drv} + \varepsilon & \text{if } T_{drv} \geq 0 \\ T_{drv} - \varepsilon \leq T_{fb} \leq \varepsilon & \text{if } T_{drv} < 0, \end{cases} \quad (9)$$

where a constant $\varepsilon$ is greater than 0, and selected to ensure a certain degree of comfort for the driver and a certain degree of capability of the EPS system to achieve motion objectives.

The conditions that satisfy Equation (9) are described in terms of driver torque on the steering column and EPS torque by the area 801, where line 802 indicates the conditions where the EPS torque cancels the action of the driver on the steering wheel, 806, 807 indicate the areas where the EPS torques overcome the driver torque and areas 808, 809 indicate the area where the EPS torque assists the driver.

For instance, given a value of the driver torque $T_{drv}$ 804, the segment 803 indicates that acceptable range 805 of the values of EPS torques including an assist range 810 and overcoming range 811. The widths 821 and 822 are determined by the value of the constant $\varepsilon$ in Equation (9).

Intervention Over Alignment Torque Constraint

Figure 9:
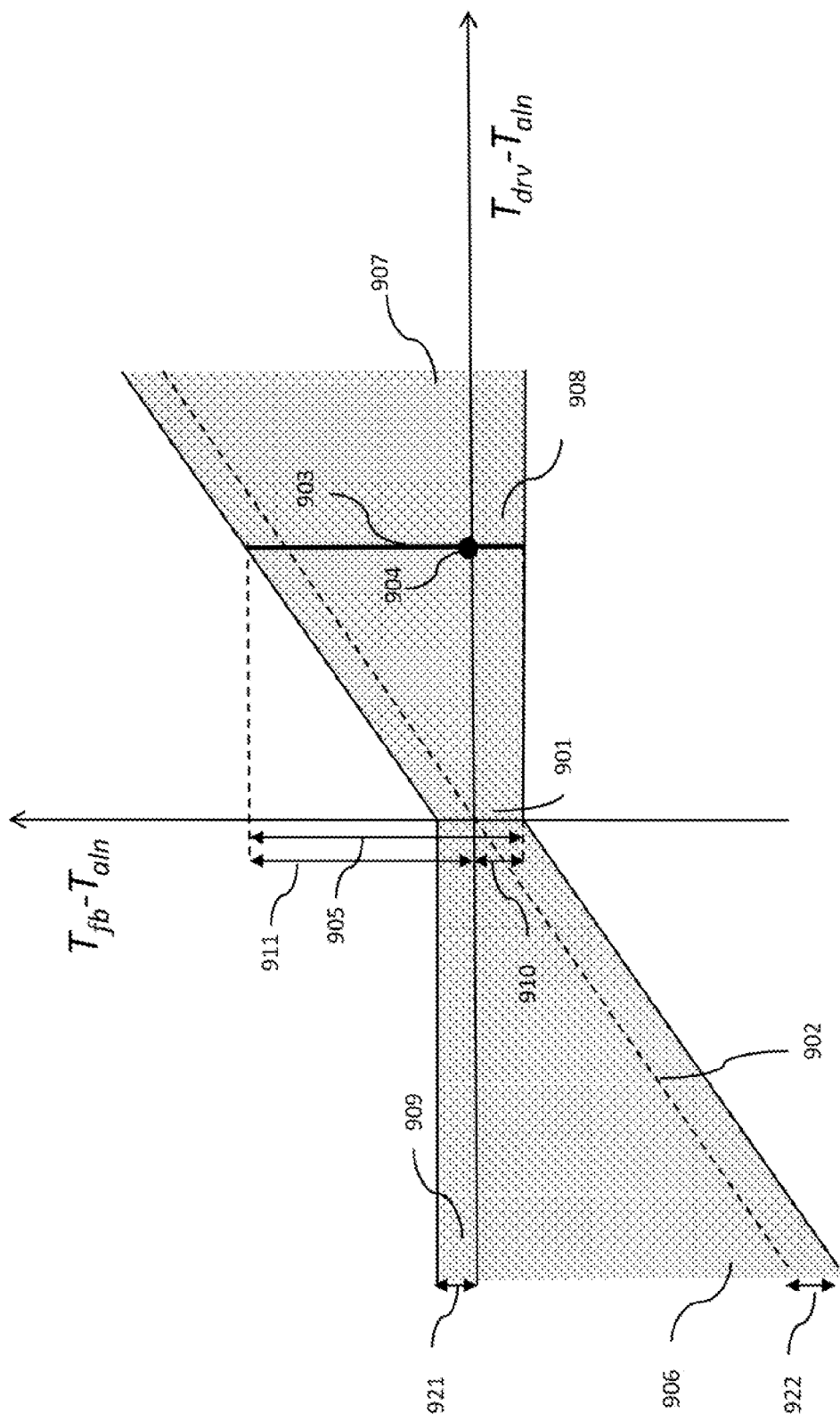
FIG. 9 is a schematic illustrating an intervention over alignment torque constraint according to one embodiment of the invention.

FIG. 9 shows an illustration of an intervention over alignment torque constraint relating the component of the feedback torque due to the EPS action to the torque that the driver is applying on the steering wheel beyond the alignment torque. This constraint is related to the expected variation in velocity of the steering wheel, and hence to the expected variation of the vehicle yaw rate. This constraint limits modification by the EPS system the variation of the vehicle behavior with respect to the vehicle behavior expected by the driver. The intervention over alignment torque constraint enforces predictability and comfort to the driver, and can be described by $$\begin{cases} T_{aln} - \varepsilon \leq T_{fb} \leq T_{drv} + \varepsilon & \text{if } T_{drv} \geq T_{aln} \\ T_{drv} - \varepsilon \leq T_{fb} \leq T_{aln} + \varepsilon & \text{if } T_{drv} < T_{aln}, \end{cases} \quad (10)$$

which can be written equivalently as $$\begin{cases} -\varepsilon \leq T_{fb} - T_{aln} \leq (T_{drv} - T_{aln}) + \varepsilon & \text{if } (T_{drv} - T_{aln}) \geq 0 \\ (T_{drv} - T_{aln}) - \varepsilon \leq T_{fb} - T_{aln} \leq +\varepsilon & \text{if } (T_{drv} - T_{aln}) < 0, \end{cases} \quad (11)$$

where a constant $\varepsilon$ is the allowed assist torque maximum overcome of the driver torque discounted for the alignment torque. The constant $\varepsilon$ is greater than 0, and is selected to ensure a certain degree of comfort for the driver and a certain degree of capability of the EPS system to achieve the objectives of the movement of the car.

The area 901 describes the conditions that satisfy Equation (11) in terms of driver torque on the steering column and EPS torque, where a line 902 indicates the conditions where the EPS torque cancels the acceleration of the steering wheel due to the driver, areas 906, 907 indicate the areas where the EPS torque reduces the acceleration of the steering wheel and areas 908, 909 indicate the area where the EPS torque increases the acceleration of the steering wheel.

For instance, given a value of the driver torque above the alignment torque $T_{drv} - T_{aln}$ 904, the segment 903 indicates that acceptable range 905 of the values of EPS torques including an assist range 910 and overcoming range 911. The widths 921 and 922 are determined by the value of the constant $\varepsilon$ in Equation (11).

The constraint Equations (8) through (11) are switching constraints because those constraints have two entries each representing a constraint (the leftmost equation) valid under certain conditions indicated by the "if statement" (rightmost equation). The changing of the "if statement" value changes the constraint entry enforced based on current conditions. Because of this the leftmost equations are the entries of the switching constraints and the rightmost terms are the switching conditions of the switching constraints.

Motion Objective Constraints and Optimization

Effect constraints define the acceptable range of torques from the EPS system enforcing comfort for the driver. The effect constraints can be enforced alone or in combination with other objective constraints selected based on the objective of the movement of the vehicle.

For example, one embodiment of the invention uses a constraint that limits the sideslip angles of the vehicles in order to guarantee the vehicle stays in the linear range 330 of the tire force characteristic 313

$$\alpha_f^{min} \leq \alpha_f \leq \alpha_f^{max}.$$

$$\alpha_r^{min} \leq \alpha_r \leq \alpha_r^{max}.$$

For example, one embodiment of the invention uses a constraint that limits the absolute torque that can be applied by the EPS system due to physical limitations of the EPS motor power according to $$T_{EPS}^{min} \leq T_{EPS} \leq T_{EPS}^{max}. \quad (12)$$

Another embodiment uses a constraint that limits the instantaneous torque variation of the EPS motor due to physical limitation of the hardware and control system according to $$\dot{T}_{EPS}^{min} \leq \dot{T}_{EPS} \leq \dot{T}_{EPS}^{max}. \quad (13)$$

The value of EPS torque actually applied to the system can be selected from the range determined by the effect constraint by optimizing various cost functions representing the objectives of the movement of the vehicle, $J_i$, $i=1, \ldots, M$, and M is the number of the objectives. For example, some embodiments determine the functions $J_i$ as cost functions, such that the optimization minimizes the cost functions.

For example, one embodiment uses a cost function describing a desired yaw rate $y_{ref}$ according to $$J_i = (y(s) - y_{ref}(s))^2, \quad (14)$$

wherein y is the current yaw rate that can be defined by the model in Equation (3). This cost function can represent vehicle trajectory tracking corresponding to the objective of the movement for improving vehicle cornering.

Another objective of the movement is to maintain position of the vehicle close to a desired position within the road $p_{ref}$. This objective can also be used for keeping the vehicle within the lanes, for collision avoidance and for other purposes. The cost function corresponding to this objective of the movement is $$J_i = (p(s) - p_{ref}(s))^2, \quad (15)$$

where the actual position of the vehicle in the road is defined by the model Equation (3).

Another objective of the movement is the maintenance of desired front and rear tire slip angles. The cost function for this objective can be $$J_i = (\alpha_f(s) - \alpha_f^{ref}(s))^2 + (\alpha_r(s) - \alpha_r^{ref}(s))^2, \quad (16)$$

where the slip angles are defined by the model in Equation (3), for instance by Equation (4).

Various embodiments use different combination of the above objectives. Some embodiments also change the form of the functions $J_i$. For instance, one embodiment use an alternative to the Equation (17) according to $$J_i = \max(|\alpha_f(s)| - |\alpha_f^{ref}(s)|) + \max(|\alpha_r(s)| - |\alpha_r^{ref}(s)|), \quad (17)$$

wherein only the slip angles that are larger than the reference contributed to $J_i$. This modification can be advantageous in some situations because large slip angles are associated to unstable vehicle motion and hence reducing larger than desired slip angles can avoid instability.

Also, the vehicle model, for instance determined by Equation (4) can be used to predict the future behavior of the vehicle motion and the steering system motion, and hence the optimal EPS torque selection can be performed on an entire future time interval. In this way the EPS torque selection is determined by the equation $$\min_{T_{EPS}(s)} \int_t^{t+\theta} J_i(T_{EPS}(s), x(s)) ds \quad (18)$$

s.t. Equation (1),
Equation (6) Equation (10),
Equation (12), Equation (13),
additional constraints,
where the additional constraints can be also used to enforce the desired motion objectives.

The solution of Equation (18) where t is the current time and $\theta$ is a time duration for a future time interval upon which the EPS torque is chosen, provides the EPS torque in the range that is acceptable for the EPS operation for the current state of the vehicle (at present time and along the time interval of duration $\theta$ that is optimal according to the motion objective $J_i$.

The additional constraints in Equation (18) can involve any standard constraint used in vehicle motion, such as velocity limits, constraints on the slip angles, yaw rate and acceleration limits, etc.

Figure 10:
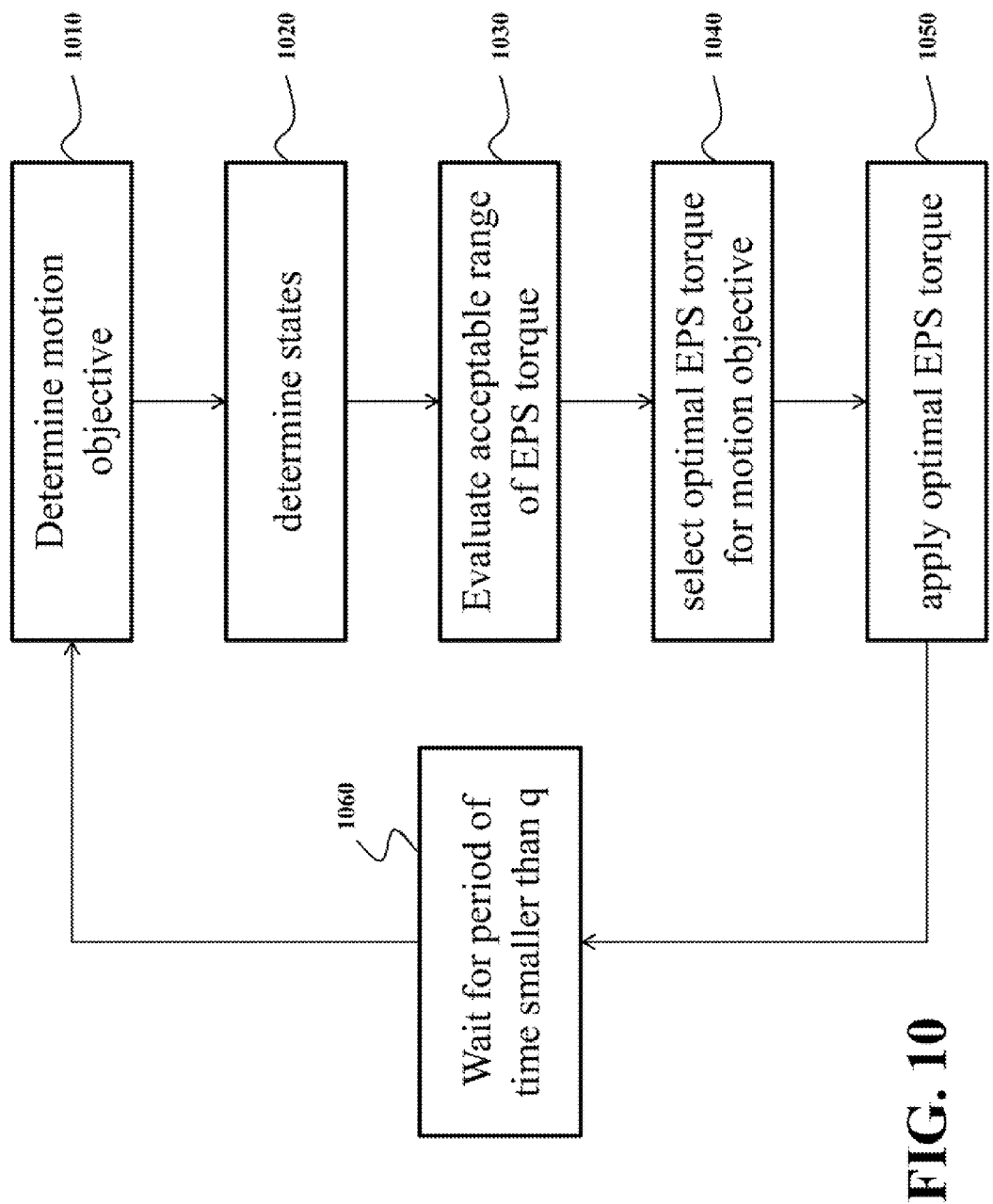
FIG. 10 is a flow chart for periodically determining of the optimal torque of the EPS system according to one embodiment of the invention.

FIG. 10 shows a flow chart for periodically determining of the optimal torque of the EPS system according to one embodiment of the invention. This embodiment adaptively responds to various changes of the state of the movement of the vehicle. In addition in some variations of this embodiment, finite time-horizon optimization methods are used to further optimize the performance of the vehicle.

At step 1010, the embodiment determines the objective of the movement and selects the appropriate objective function and constraints. At step 1020, the embodiment determines the current state of the movement of the vehicle including one or combination of the state of the vehicle, the state of the steering system and the state of the EPS system.

At step 1030, the embodiment selects the EPS system constraints to be enforced and determines, for the current state obtained at the step 1020, the range of acceptable the EPS values. At step 1040, the embodiment selects the value of the EPS torque which is in the range defined at the step 1030 and optimizes the objective function and additional constraints selected at the step 1010. At step 1050, the embodiment controls the EPS system to produce the torque obtained at the step 1040 for at most $\theta$ seconds from the current time t. After a time smaller than $\theta$ 1060 in response to a change in the state of the movement of the vehicle, the embodiment repeats steps 1010, 1020, 1030, 1040, 1050, and 1060.

In various implementations of this embodiment, the steps 1010, 1020, 1030, 1040, 1050, and 1060 are executed sequentially or concurrently (at least in part). The selection of the optimal value of torque can be done by a number of methods including the solution of numerical optimization problems, such as quadratic programs, nonlinear programs, two-points boundary value problems, global optimization, etc.

In some embodiments to simplify the computation for the enforcement of the constraints in Equations (8)-(10) that are switching constraints, the switching conditions are assumed unchanged during the future time interval of length $\theta$ during which is considered in the selection of the EPS system torque.

One embodiment determines the range of the value according to one or combination of Equations (8) through (10) using the following steps. The embodiment determines the switching condition at current time based on current vehicle, steering, and EPS state, and selects the entry of the constraint based on the switching condition at current time. Next, the embodiment enforces the selected entry based on the current value of the switching condition of the constraint for the entire future motion interval using for selecting the EPS system torque.

Vehicle Steering System

Figure 11:
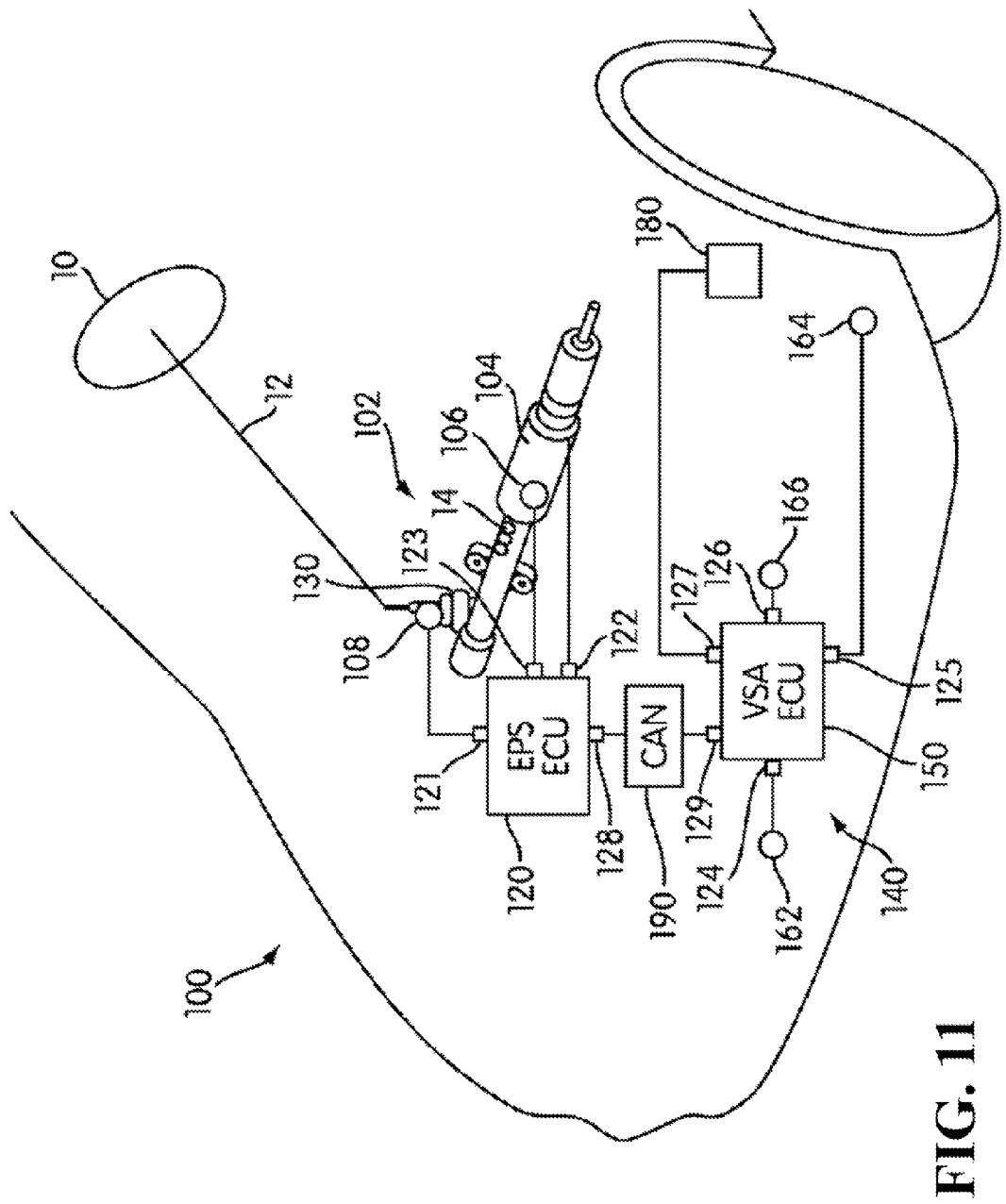
FIG. 11 is a schematic view of an embodiment of motor vehicle steering system employing control methods according to various embodiments of the invention.

FIG. 11 is a schematic view of an embodiment of motor vehicle steering system 100 employing control methods according to various embodiments of the invention. The term "vehicle" or "motor vehicle" as used throughout the specification and claims refers to any moveable. The term "vehicle" or "motor vehicle" includes, but is not limited to: cars, trucks, vans, minivans, SUVs, motorcycles, scooters, boats, personal watercraft, and aircraft. In some cases, the motor vehicle includes one or more engines.

For purposes of illustration, some components of motor vehicle 100 are shown schematically. In one embodiment, the motor vehicle 100 can include steering wheel 110 that is further connected to steering column 112. The steering column 112 can be connected to a rack 114, which can be further connected to the front wheels of motor vehicle 100 using tie rods.

The motor vehicle 100 can include a power steering system 102. The power steering system 102 can be any system designed to reduce the steering effort used by a driver to turn or steer a motor vehicle. In some cases, power steering system 102 can be a hydraulic type power steering system. In other cases, power steering system 102 can be an electric power steering system. In an exemplary embodiment, power steering system 102 can be an electric power steering system (EPS) that uses an electric motor to provide assistance in turning or steering a motor vehicle.

Power steering system 102 can include a gearbox 130. Gearbox 130 can be any type of gearbox known in the art. In some embodiments of power steering system 102, gearbox 130 can be of a rack-and-pinion type. In some embodiments of power steering system 102, gearbox 130 can be of a dual pinion type. In some embodiments, gearbox can be of a recirculating ball-and-rack type.

FIG. 11 shows an embodiment having a rack-and-pinion gearbox. The function of gearbox 130 can be to allow a turn of steering wheel 10 to turn motor vehicle 100. Steering wheel 10 turns in circles. The turn of the steering wheel 10 creates an angular force in steering column 12. In some motor vehicles 100 this angular force can be redirected to turn the vehicle. In some embodiments, the angular force can be redirected into a sideways motion (lateral motion) of rack 14. Gearbox 130 can be a combination of gears that redirect the angular force from steering column 12 to a lateral force in rack 14.

Power steering system 102 can include provisions for assisting a driver in turning a motor vehicle. In one embodiment, power steering system 102 can include a steering motor 104. Generally, steering motor 104 can be any type of motor. In an exemplary embodiment, steering motor 104 can be an electric motor that is configured to drive one or more components of a motor vehicle to assist in turning the motor vehicle.

Steering motor 104 can be arranged in various locations within motor vehicle 100. Steering motor 104 can be disposed proximate a steering column 12. Steering motor can be disposed proximate a gear of gearbox 130. As shown in FIG. 1, steering motor 104 can be installed concentrically around rack 14 to provide assistance in moving the rack 14 to the left or to the right. In other embodiments using different types of steering systems, the steering motor 104 can be provided in various locations to provide assistance in turning the motor vehicle.

Power steering system 102 can include provisions for monitoring the rotation of steering column 12. In some cases, power steering system 102 can include a position sensor that is configured to monitor the absolute position of steering column 12. In other cases, power steering system 102 can include a rotation sensor of some kind that is configured to directly monitor the rotation of steering column 12. In embodiments using the steering motor 104 to help assist with turning, power steering system 102 can include a sensor configured to measure the angular rotation of the motor. Because the rotation of a motor in a power steering system is typically related to the rotation of a steering column by a fixed gear ratio, a measurement of the rotation of the motor can be related directly to a measurement of the rotation of the steering column.

In some embodiments, the power steering system 102 can include rotation sensor 106. Generally, the rotation sensor 106 can be any type of sensor configured to detect the rotation of steering motor 104. For example, in one embodiment, a plurality of Hall effect sensors can be associated with steering motor 104 to measure movements of a rotor. In some embodiments, a resolver or rotary electrical transformer can be used for detecting the rotations of a rotor within steering motor 104. In still other embodiments, other types of sensors can be used for detecting the rotation of steering motor 104.

Rotation sensor 106 can be arranged at various locations in the power steering system 102. The power steering system 102 can employ different types of gearboxes 130. Each type of gearbox 130 can position gears in different locations. Steering motor 104 and various sensors can be positioned in different locations based on the type of gearbox 130. For example, rotation sensor 106 can be positioned depending on many factors, including but not limited to the placement of gears, the type of gearbox 130, the type of steering motor 104, the placement of steering motor 104, and other factors.

Power steering system 102 can also include provisions for detecting torque applied by a driver to a steering system. In one embodiment, power steering system 102 can include steering torque sensor 108. In some cases, steering torque sensor 108 can be associated with gearbox 130. In other cases, however, steering torque sensor 108 can be provided at any other location of a steering system. Using this arrangement, a power steering system can determine the amount of steering assistance that can be required.

Motor vehicle 100 can include provisions for communicating, and in some cases controlling, the various components associated with power steering system 102. In some embodiments, motor vehicle 100 can be associated with a computer or similar device. In the current embodiment, motor vehicle 100 is associated with a power steering system electronic control unit, hereby referred to as first Electronic Control Unit (first ECU) 120. In one embodiment, first ECU 120 can be configured to communicate with, and/or control, steering motor 104, rotation sensor 106 and steering torque sensor 108 as well as other components or systems.

The first ECU 120 can include a number of ports that facilitate the input and output of information and power. The term "port" as used herein refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with first ECU 120 are optional. Some embodiments can include a given port or provision, while others can exclude it. The following description discloses many of the possible ports and provisions that can be used, however, it should be kept in mind that not every port or provision must be used or included in a given embodiment.

In one embodiment, the first ECU 120 can include first port 121 for communicating with steering torque sensor 108, the second port 122 for communicating with the steering motor 104 and the third port 123 for communicating with rotation sensor 106. In particular, using the first port 121, the first ECU 120 can receive information from the steering torque sensor 108 related to the torque applied to the steering column 12. With this information, the first ECU 120 can determine how much steering assistance is required and send a control signal to the steering motor 104, using the second port 122 to operate the steering motor 104 in a manner that provides the required steering assistance. In addition, the first ECU 120 can receive information from the rotation sensor 106 via the third port 123 about the rotation of the steering motor 104, which can be used to further determine the rotation of the steering column 12.

Motor vehicle 100 can include provisions for providing vehicle stability assistance during driving. In an exemplary embodiment, the motor vehicle 100 can include a vehicle stability assist system 140 (VSA). The vehicle stability assist system 140 can be any electric stability control system that is capable of modifying the operation of the vehicle by detecting and preventing undesirable motions such as skidding. In particular, vehicle stability assist system 140 can be configured to detect loss of steering control and provide individual braking at different wheels to help redirect a vehicle.

A vehicle stability assist system 140 can be associated with one or more sensors configured to receive information related to operating conditions of the vehicle 100. In some embodiments, motor vehicle 100 can include acceleration sensor 162. Generally, acceleration sensor 162 can be any type of acceleration sensor. In one embodiment, acceleration sensor 162 can be a gyroscopic sensor configured to receive information related to a yaw rate of a vehicle and/or lateral acceleration information. Although a single sensor can be used in the current embodiment for detecting yaw rate and lateral acceleration, in other embodiments more than one sensor can be used with a motor vehicle.

Acceleration sensor 162 can be positioned in various locations within motor vehicle 100. The location of acceleration sensor 162 can be influenced by the type of gearbox 130, as well as other factors known to those in the art. For example, the other factors can include a type of engine in motor vehicle 100 and a type of drive train. In some embodiments, acceleration sensor 162 can be located within a vehicle stability assist system electronic control unit.

In one embodiment, the motor vehicle 100 can include set of wheel speed sensors 164. In some cases, the set of wheel speed sensors 164 can comprise a set of four independent wheel speed sensors associated with the four wheels of motor vehicle 100. In particular, each wheel speed sensor of set of wheel speed sensors 164 can be configured to detect the speed of a corresponding wheel of motor vehicle 100. Using this information, vehicle stability assist system 140 can detect variations in wheel speed over each of the four wheels of motor vehicle 100 for detecting slipping, skidding, or other undesirable vehicle motions. Furthermore, while four wheel speed sensors can be used in an exemplary embodiment, other embodiments can include any other number of wheel speed sensors. In an alternative embodiment including a vehicle with more than four wheels, for example, more than four wheel speed sensors can be provided on the motor vehicle.

The wheel speed sensor 164 can be placed in various locations within the motor vehicle 100. The location of the wheel speed sensor 164 can be influenced by many factors including, but not limited to, the type of drive train employed by the motor vehicle and the configuration of the braking system. In some embodiments, the wheel speed sensor 164 can communicate with first ECU 120.

In some embodiments, motor vehicle 100 can include vehicle speed sensor 166. In some cases, vehicle speed sensor 166 can be a vehicle speed pulse sensor associated with a transmission of motor vehicle 100. In other cases, vehicle speed sensor 166 can be any other type of sensor configured to provide vehicle speed information to one or more systems of motor vehicle 100. By monitoring information received from vehicle speed sensor 166, vehicle stability assist system 140 can be configured to detect abnormal operating conditions of the motor vehicle.

The motor vehicle 100 can include provisions for communicating, and in some cases controlling, the various components associated with vehicle steering assist system 140. In some embodiments, motor vehicle 100 can be associated with a computer or similar device. In the current embodiment, the motor vehicle 100 can be associated with the vehicle stability assist system electronic control unit, hereby referred to as second ECU 150. In one embodiment, the second ECU 150 can be configured to communicate with, and/or control various sensors and systems of motor vehicle 100 that are utilized in the operating vehicle stability assist system 140.

The second ECU 150 can include a number of ports that facilitate the input and output of information and power. In one embodiment, second ECU 150 can include fourth port 124 for communicating with acceleration sensor 162. In particular, second ECU 150 can be configured to receive information related to a yaw rate of motor vehicle 100 from acceleration sensor 162. In addition, second ECU 150 can be configured to receive lateral acceleration information related to motor vehicle 100 from acceleration sensor 162. Also, second ECU 150 can include fifth port 125 for communicating with set of wheel speed sensors 164. In particular, second ECU 150 can be configured to receive information about the speeds of one or more wheels of motor vehicle 100. Also, second ECU 150 can include sixth port 126 for communicating with vehicle speed sensor 166. In particular, second ECU 150 can be configured to receive vehicle speed pulse information associated with a transmission of motor vehicle 100. With this arrangement, second ECU 150 can be configured to determine various operating conditions of motor vehicle 100 to determine if motor vehicle 100 is skidding or sliding.

The vehicle stability assist system 140 can also include provisions for controlling one or more systems of a motor vehicle in order to provide stability control. In some embodiments, second ECU 150 can include seventh port 127 for communicating with braking system 180. For example, in some cases, upon detecting a skidding condition of a motor vehicle, second ECU 150 can send control signals to breaking system 180 to apply individual breaking to the wheels of motor vehicle 100 in order to stabilize the driving conditions and reduce skidding. In other embodiments, vehicle stability assist system 140 can be associated with additional systems of a motor vehicle for assisting in controlling a motor vehicle during skidding or other undesired operating conditions. For example, in another embodiment, second ECU 150 could be configured to control an engine in a manner that reduces power during situations where steering control fails.

The motor vehicle 100 can include provisions for providing communication between various systems. In one embodiment, motor vehicle 100 can include provisions for providing communication between power steering system 102 and vehicle stability assist system 140. In some cases, motor vehicle 100 can include vehicle controller area network 190. In some cases, vehicle controller area network 190 can provide communication between any systems of a motor vehicle utilizing some type of electronic control unit. In an exemplary embodiment, vehicle controller area network 190 is configured to provide communication between power steering system 102 and vehicle stability assist system 140. In particular, first ECU 120 of power steering system 102 can communicate with vehicle controller area network 190 using eighth port 128, while second ECU 150 of vehicle stability assist system 140 can communicate with vehicle controller area network using ninth port 129.

A motor vehicle can include provisions for determining the steering angle for use in one or more subsystems. For example, a vehicle stability assist system can require a steering angle for purposes of comparing the actual vehicle motion (as measured by various sensors) with the intended motion of the driver (as measured by steering angle).

In addition, the above-described embodiments of the present invention can be implemented in any of numerous ways. For example, the embodiments can be implemented using hardware, software or a combination thereof. When implemented in software, the software code can be executed on any suitable processor or collection of processors, whether provided in a single computer or distributed among multiple computers. Such processors can be implemented as integrated circuits, with one or more processors in an integrated circuit component. Though, a processor can be implemented using circuitry in any suitable format.

Also, the various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine.

In this respect, the invention can be embodied as a non-transitory computer-readable medium or multiple computer readable media, e.g., a computer memory, compact discs (CD), optical discs, digital video disks (DVD), magnetic tapes, and flash memories. The terms "program" or "software" are used herein in a generic sense to refer to any type of computer code or set of computer-executable instructions that can be employed to program a computer or other processor to implement various aspects of the present invention as discussed above.

Computer-executable instructions can be in many forms, such as program modules, executed by one or more computers or other devices. Generally, program modules include routines, programs, objects, components, data structures that perform particular tasks or implement particular abstract data types. Typically the functionality of the program modules can be combined or distributed as desired in various embodiments.

Also, the embodiments of the invention can be embodied as a method, of which an example has been provided. The acts performed as part of the method can be ordered in any suitable way. Accordingly, embodiments can be constructed in which acts are performed in an order different than illustrated, which can include performing some acts simultaneously, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for controlling a torque of an electric power steering (EPS) system of a vehicle, comprising:
    determining, using a state of a lateral movement of the vehicle, current torques acting on the vehicle and a torque applied on the steering wheel by a driver, constraints defining a range of values of the torque of the EPS system satisfying the constraints, wherein the constraints include at least one constraint on an effect of the torque of the EPS system on the steering wheel, wherein the constraint on the effect includes a constraint on a minimal value and a constraint on a maximal value of the torque of the EPS system in relation to the torque applied on the steering wheel by a driver, wherein the minimal and the maximal values of the constraint on the effect are determined from the current torques acting on the vehicle;
    selecting a value of the torque within the range of values based on an objective of the movement of the vehicle;
    commanding a motor of the EPS system to generate the torque according to the value of the torque; and
    repeating the determining, the selecting and the commanding steps in response to a change of at least one of the state of the steering wheel, the state of the EPS system and the state of the vehicle, such that the constraints defining the range of values of the torque of the EPS system are different for at least two different time periods.

2. The method of claim 1, further comprising:
    determining the objective of the movement of the vehicle;
    selecting the constraints and a cost function according to the objective; and
    optimizing the cost function subject to the constraints to determine the value.

3. The method of claim 1, wherein the constraint on the effect is a function of at least some of the torque of the EPS system, an alignment torque exerted by a road through wheels of the vehicle on a steering column of the vehicle and a torque applied to the steering wheel of the vehicle.

4. The method of claim 1, wherein the constraint on the effect includes a constraint on a minimum and a maximum amount of feedback torque on the steering wheel.

5. The method of claim 1, wherein the constraint on the effect includes a constraint on a maximum intervention torque on the steering wheel.

6. The method of claim 1, wherein the constraint on the effect includes a constraint on a percentage of the alignment torque propagated to the steering wheel.

7. The method of claim 1, wherein the constraint on the effect includes a difference between an intervention torque on the steering wheel and a current torque applied to the steering wheel by a driver.

8. The method of claim 1, wherein the constraint on the effect includes a constraint on an intervention over an alignment torque.

9. The method of claim 1, wherein the objective is cornering performance of the vehicle.

10. The method of claim 1, wherein the objective is stability of the vehicle.

11. The method of claim 1, wherein the objective is maintaining a position of the vehicle with respect to a road.

12. The method of claim 1, further comprising:
    repeating the determining, the selecting and the commanding step periodically every period of time $\theta$.

13. A method for controlling a torque of an electric power steering (EPS) system of a vehicle, comprising steps of:
    determining an objective of a lateral movement of the vehicle;
    determining a cost function of the movement of the vehicle based on the objective of the movement;
    determining constraints defining a range of values of the torque of the EPS system, wherein the constraints are determined using a state of the lateral movement and a torque applied on the steering wheel by a driver and include at least one effect constraint on effect of the torque of the EPS system on a steering wheel of the vehicle, and at least one objective constraint selected based on the objective of the lateral movement of the vehicle, wherein the constraint on the effect includes a constraint on a minimum and a maximum amount of feedback torque on the steering wheel; optimizing the cost function subject to the constraints; generating a control signal for controlling the torque of the EPS system according to the optimizing step; and wherein the steps are performed by a processor.

14. The method of claim 13, wherein the constraints include a switching constraint, further comprising:
    determining switching conditions of the switching constraint;
    selecting an entry of the switching constraint according to the switching conditions;
    enforcing the entry during the optimization for a time period $\theta$.

15. An electric power steering (EPS) system of a vehicle, comprising:
    a processor for determining, based on a state of a lateral movement of the vehicle and a current torque applied on the steering wheel by a driver, constraints defining a range of values of the torque of the EPS system satisfying the constraints and for selecting a value of the torque within the range based on an objective of the movement of the vehicle, wherein the constraints include at least one constraint on an effect of the torque of the EPS system on a steering wheel determined using the state of the lateral movement and the current torque, wherein the constraint on the effect includes a difference between an intervention torque on the steering wheel and the current torque applied to the steering wheel by a driver; and
    a motor generating the torque according to the selected value.

16. The EPS of claim 15, wherein the processor receives the objective of the movement of the vehicle from an external system, selects the constraints and a cost function according to the objective and optimizes the cost function subject to the constraints to determine the value.

17. The EPS of claim 15, wherein the constraint on the effect is a function of at least some of the torque of the EPS system, an alignment torque exerted by a road through wheels of the vehicle on a steering column of the vehicle and a torque applied to the steering wheel of the vehicle.

18. The EPS of claim 17, wherein the processor determines the value of the torques in response to a change of the alignment torque.

\* \* \* \* \*